April 14, 1959     A. FLETTNER     2,881,989
AIR VEHICLE WITH ROTARY WING
Filed Dec. 12, 1955
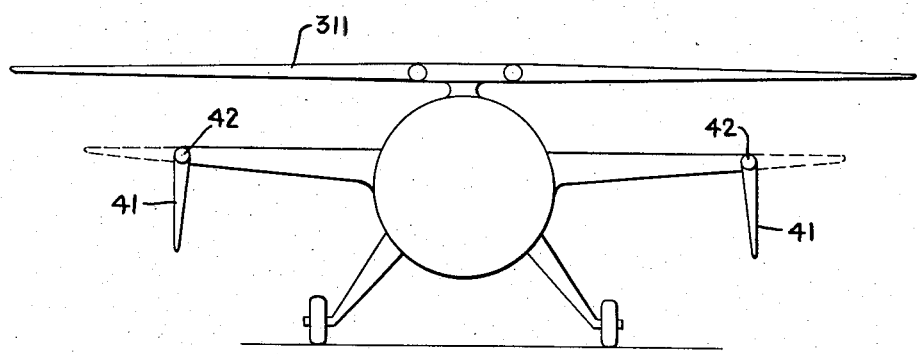
INVENTOR:
ANTON FLETTNER,
BY
*HIS ATTORNEY.*

United States Patent Office 2,881,989
Patented Apr. 14, 1959

2,881,989
AIR VEHICLE WITH ROTARY WING

Anton Flettner, Kew Gardens, N.Y.

Application December 12, 1955, Serial No. 552,499

2 Claims. (Cl. 244—6)

The invention relates to air vehicles heavier than air, and relates more particularly to such vehicles equipped with rotors such as convertiplanes. This is a continuation-in-part application, reference being had to my application Serial No. 101,121 filed June 24, 1949, now abandoned.

My invention proposes high loaded rotors with features which are different from the smaller and low speed helicopter. The disk load of a conventional helicopter is about 2 to 3 lbs. per sq. ft. My high loaded rotors will have a disk loading of at least 8 and, preferably, 12 to 20 lbs. and more per sq. ft. Thus, we have to figure for the disk loading approximately 6 to 10 times that of conventional helicopter rotors.

To obtain 100 lbs. of thrust, a normal helicopter rotor requires about 5 H.P. For the same thrust high loaded, large helicopters need about 25 to 50 H.P.

Connected with these high loaded and high powered rotor systems is a very strong and powerful rotor downwash. To minimize this tremendous downwash effect, the wing parts which are in danger are designed as tilting wings and made rotatable in the direction of the rotor downwash.

For a fuller understanding of the foregoing and other objects, reference should be had to the appended drawing, the single figure of which is a schematic rear elevational view of an airplane with wings tiltable about axes parallel of the direction of forward flight.

Tilting of the wings may be arranged about horizontal axes in the direction of the flight. This is illustrated in the drawing, wherein the outer wing parts 41 are tilted about pivots 42 to the main portions of the wings. During operation of the rotor 311, the tiltable portions 41 will be tilted downwardly by the downwash into a vertical position (shown in solid lines in the drawing). The re-positioning (shown in broken lines) is effected by the drive wind during the forward flight. The drive wind acts on the outer wing parts 41 because they are profiled to create lift thrust like an airplane wing.

I wish it to be understood that I do not desire to be limited to the exact details of construction shown and described; for obvious modifications will occur to a person skilled in the art.

Having thus described the invention, what I claim as new and desire to be secured by Letters Patent, is as follows:

1. An air vehicle including a rotary wing system for lift thrust rotatable about an upright axis and fixed wings, each fixed wing including a fixed portion and a movable portion tiltable about an axis parallel of the direction of forward flight between a normal position in alignment with said fixed portion during forward flight and, respectively, a downward hanging position at an angle thereto and being tiltable into said downward hanging position during hovering by the down wash generated by the rotary wing system.

2. An air vehicle, as claimed in claim 1, said movable portions of said fixed wings being profiled as airplane wings and being operable to be lifted into the normal position by the upward lift thrust component generated by the drive wind during forward flight.

References Cited in the file of this patent

UNITED STATES PATENTS

| 1,761,444 | Jones | June 3, 1930 |
| 1,842,250 | Bobrovsky et al. | Jan. 19, 1932 |
| 2,580,312 | Moore | Dec. 25, 1951 |